United States Patent
Kato (10) Patent No.: US 8,103,106 B2
(45) Date of Patent: Jan. 24, 2012

(54) IMAGE PROCESSING METHOD, IMAGE PROCESSING METHOD PROGRAM, RECORDING MEDIUM RECORDING IMAGE PROCESSING METHOD PROGRAM, AND IMAGE PROCESSING APPARATUS

(75) Inventor: Shinji Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 1188 days.

(21) Appl. No.: 11/843,741

(22) Filed: Aug. 23, 2007

(65) Prior Publication Data

US 2008/0175485 A1    Jul. 24, 2008

(30) Foreign Application Priority Data

Aug. 25, 2006   (JP) .................................. 2006-229289

(51) Int. Cl.
*G06K 9/46* (2006.01)
(52) U.S. Cl. ......... 382/203; 382/103; 382/118; 382/291
(58) Field of Classification Search .................. 382/103, 382/203, 118, 291, 305
See application file for complete search history.

(56) References Cited

U.S. PATENT DOCUMENTS

| | | | | |
|---|---|---|---|---|
| 6,556,775 B1* | 4/2003 | Shimada | ........................ | 386/241 |
| 7,340,079 B2* | 3/2008 | Segawa et al. | ................. | 382/118 |
| 7,526,193 B2* | 4/2009 | Minato et al. | .................. | 396/123 |
| 7,548,936 B2* | 6/2009 | Liu et al. | ................................ | 1/1 |
| 7,580,587 B2* | 8/2009 | Matsugu et al. | ............... | 382/274 |
| 7,652,709 B2* | 1/2010 | Kanda et al. | .............. | 348/333.02 |
| 7,720,258 B1* | 5/2010 | Ullmann | ........................ | 382/103 |
| 7,822,233 B2* | 10/2010 | Nagaoka et al. | ............... | 382/118 |
| 2005/0105806 A1* | 5/2005 | Nagaoka et al. | ............... | 382/224 |
| 2006/0204134 A1* | 9/2006 | Modrall et al. | ................ | 382/291 |

FOREIGN PATENT DOCUMENTS

| | | |
|---|---|---|
| JP | 2002-024299 | 1/2002 |
| JP | 2002-215643 | 8/2002 |
| JP | 2006-067512 | 3/2006 |
| JP | 2006-081021 | 3/2006 |
| JP | 2006-163527 | 6/2006 |

OTHER PUBLICATIONS

A Japanese Office Action dated Nov. 27, 2008 issued in connection with counterpart Japanese Patent Application No. 2006-229289.
Japanese Office Action dated Aug. 21, 2008 for Application No. 2006-229289.

* cited by examiner

*Primary Examiner* — Gregory M Desire
(74) *Attorney, Agent, or Firm* — SNR Denton US LLP (57) ABSTRACT

A method of processing a plurality of still images. The method includes the steps of: detecting an object photographed for each of the still images; arranging the object detected by the step of detecting an object with respect to the plurality of still images and detecting an object photographed by the plurality of still images; relating objects having a strong relationship out of the plurality of objects detected by the step of arranging the object; selecting a still image including at least one of the objects detected by the step of relating objects from the plurality of still images; and outputting the still image selected by the step of selecting a still-image.

10 Claims, 13 Drawing Sheets

| IMAGE DATA \ PERSON | 6 | 5 | 4 | 3 | 2 | 1 |
|---|---|---|---|---|---|---|
| a | 0 | 0 | 0 | 1 | 0 | 0 |
| b | 0 | 1 | 0 | 1 | 0 | 1 |
| c | 0 | 0 | 0 | 1 | 0 | 0 |
| d | 0 | 1 | 0 | 0 | 0 | 1 |
| e | 0 | 0 | 0 | 1 | 0 | 0 |
| f | 0 | 0 | 0 | 0 | 0 | 0 |
| g | 0 | 0 | 0 | 1 | 0 | 0 |
| h | 0 | 1 | 0 | 0 | 0 | 1 |
| i | 0 | 0 | 0 | 0 | 1 | 0 |
| j | 0 | 0 | 0 | 1 | 0 | 0 |
| k | 0 | 0 | 0 | 0 | 0 | 1 |
| l | 0 | 0 | 0 | 1 | 0 | 0 |
| m | 0 | 0 | 0 | 0 | 0 | 0 |
| n | 0 | 0 | 0 | 1 | 0 | 0 |
| o | 0 | 0 | 0 | 1 | 0 | 0 |
| ⋮ | ⋮ | ⋮ | ⋮ | ⋮ | ⋮ | ⋮ |

PRINT FOR EACH INDIVIDUAL

PRINT FOR EACH GROUP

RETURN TO TOP

IMAGE PROCESSING METHOD, IMAGE PROCESSING METHOD PROGRAM, RECORDING MEDIUM RECORDING IMAGE PROCESSING METHOD PROGRAM, AND IMAGE PROCESSING APPARATUS

CROSS REFERENCES TO RELATED APPLICATIONS

The present invention contains subject matter related to Japanese Patent Application JP 2006-229289 filed in the Japanese Patent Office on Aug. 25, 2006, the entire contents of which are incorporated herein by reference.

BACKGROUND OF THE INVENTION

1. Field of the Invention

The present invention relates to an image processing method, an image processing method program, a recording medium recording the image processing method program, and an image processing apparatus, and can be applied to a terminal apparatus for printing photographs, for example. The present invention detects objects having a strong relationship among the objects which have been detected from a plurality of still images, and selects and outputs the still images including at least one of the objects. Thereby, the present invention enables the user to figure out the number of copies for distribution easily to process still images.

2. Description of the Related Art

In recent years, terminal apparatuses for printing photographs taken by electronic still cameras have been installed in large-scale DPE stores, convenience stores, etc. Such a terminal apparatus prints out photographs by the operation of a user himself/herself. When the user attaches a recording medium, such as a memory card, etc., holding still images, which are the result of taking photographs, to the terminal apparatus, a menu including various kinds of selection options is displayed. When the user makes a selection from this menu, for example the still images recorded on this recording medium are displayed as thumbnail images in a list. Also, when the user sets the number of copies of each still image to print, etc., in this list display, and instructs printing, the user is allowed to print the set number of copies of and the set size of the photographs.

On such still image processing, for example Japanese Unexamined Patent Application Publication No. 2002-215643 has proposed a method in which human faces are recognized in still images, and the still images are classified on the basis of the face recognition result.

Photographs taken by an electronic still camera sometimes include one person, and sometimes include many persons. When a photograph including only one person is printed and distributed to that person, only one copy of photograph should be printed. On the other hand, when there are many persons taken in a photograph, there are cases where the many persons are family members, or cases where the many persons are unrelated persons, namely group members who are friends. Accordingly, when a photograph including many persons is printed and distributed to those persons, if this photograph is of a family, only one photograph should be printed. On the other hand, if this photograph is of group members, who are friends and unrelated persons, it becomes necessary to print out the same number of copies of the photograph as the number of persons in the photograph.

Accordingly, to date, when the user prints photographs taken by an electronic still camera using a printer, it has been necessary for the user to check and set the number of copies for distribution of each photograph while checking relationships among the persons in the photographs after all. Thus, there has been a problem in that the setting for the printing is troublesome.

SUMMARY OF THE INVENTION

The present invention has been made in view of the above point. It is desirable to propose an image processing method, an image processing method program, a recording medium recording the image processing method program, and an image processing apparatus capable of figuring out the number of copies for distribution easily to process still images.

According to an embodiment of the present invention, there is provided a method of processing a plurality of still images, including the steps of: detecting an object photographed for each of the still images; arranging the object detected by the step of detecting an object with respect to the plurality of still images and detecting an object photographed by the plurality of still images; relating objects having a strong relationship out of the plurality of objects detected by the step of arranging the object; selecting a still image including at least one of the objects detected by the step of relating objects from the plurality of still images; and outputting the still image selected by the step of selecting a still-image.

Also, according to another embodiment of the present invention, there is provided a program of a method of processing a plurality of still images, the program comprising the steps of: detecting an object photographed for each of the still images; arranging the object detected by the step of detecting an object with respect to the plurality of still images and detecting an object photographed by the plurality of still images; relating objects having a strong relationship out of the plurality of objects detected by the step of arranging the object; selecting a still image including at least one of the objects detected by the step of relating objects from the plurality of still images; and outputting the still image selected by the step of selecting a still-image.

Also, according to another embodiment of the present invention, there is provided a recording medium for recording a program of a method of processing a plurality of still images, including the steps of: detecting an object photographed for each still image; arranging the object detected by the step of detecting an object with respect to the plurality of still images and detecting the object photographed by the plurality of still images; relating objects having a strong relationship out of the plurality of objects detected by the object arrangement section; selecting a still image including at least one of the objects, detected by the step of relating, from the plurality of still images; and outputting the still image selected by the step of selecting a still-image.

Also, according to another embodiment of the present invention, there is provided an image processing apparatus for processing a plurality of still images, including: an object detection section detecting an object photographed for each of the still images; an object arrangement section arranging the object detected by the object detection section with respect to the plurality of still images, and detecting an object photographed by the plurality of still images; a relating section detecting objects having a strong relationship out of the plurality of objects detected by the object arrangement section; a still-image selection section selecting a still image including at least one of the objects detected by the relating section from the plurality of still images; and a still-image outputting section outputting the still image selected by the still-image selection section.

By the configuration of the above-described embodiments, even if any number of objects having strong relationships are included in each still image, it is possible to select and output only the still images including the objects having strong relationships from a plurality of still images. Accordingly, when distributing still images including a specific object, even if the specific objects are a plurality of objects, it is possible for the user to select and output still images without duplication of the plurality of the objects, and thus to figure out the number of copies for distribution easily to process still images.

By the present invention, it is possible for the user to figure out the number of copies for distribution easily to process still images.

DESCRIPTION OF THE PREFERRED EMBODIMENTS

In the following, a detailed description will be given of embodiments of the present invention with reference to the drawings appropriately.

First Embodiment

1. Configuration of Embodiment

Figure 2:
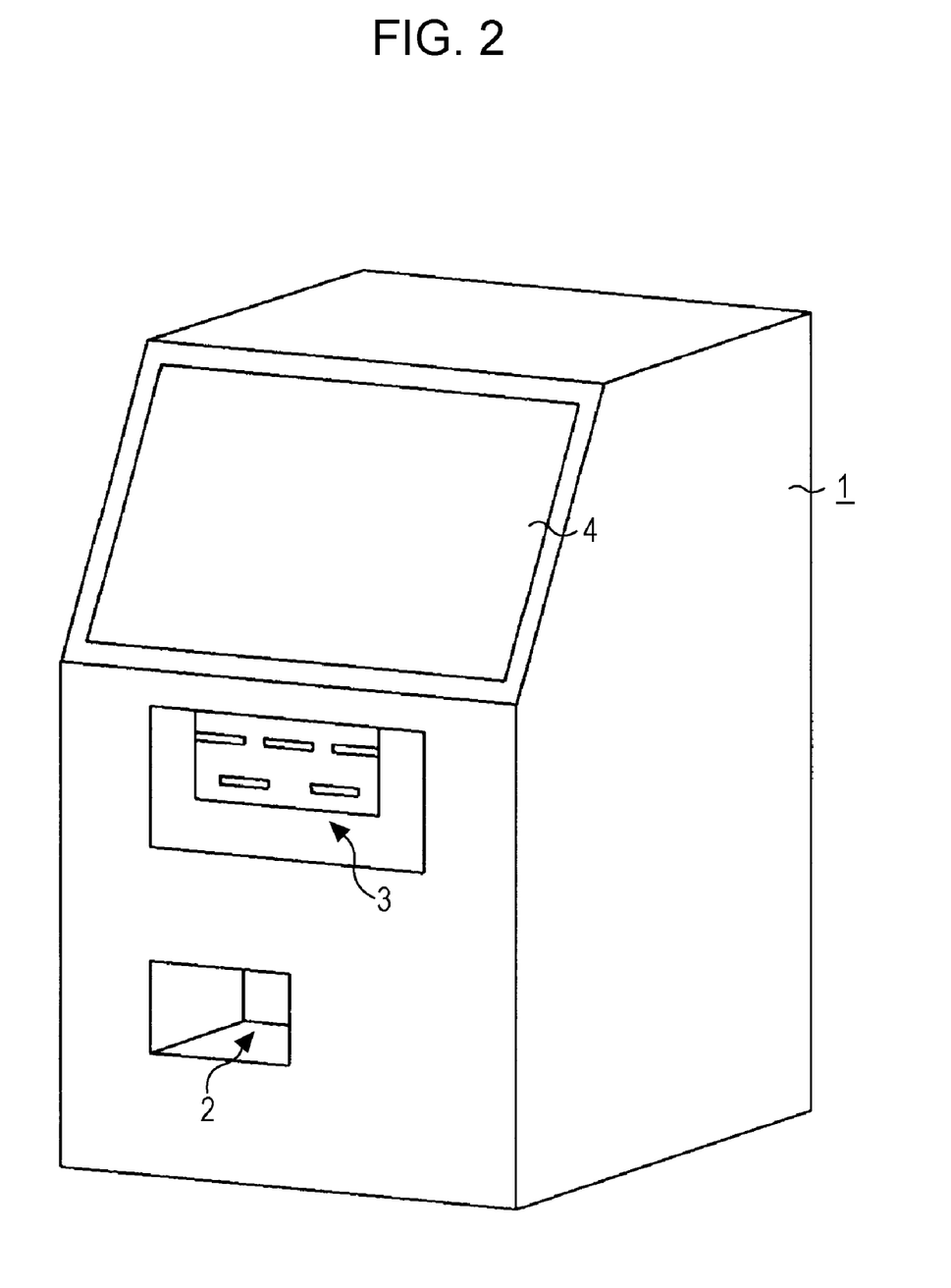
FIG. 2 is a perspective view illustrating the image printer according to the first embodiment of the present invention.

FIG. 2 is a perspective view illustrating an image printer according to a first embodiment of the present invention. The image printer 1 is a terminal apparatus for printing a still image taken by an electronic still camera, and is installed at each store in order to print still images recorded on a memory card, etc.

Here, the image printer 1 is formed to be longitudinally rectangular in shape on the whole, and is provided with an outlet 2 for taking out photographs, which are the print result of the still images at the front. Also, a recording medium insertion slot 3 for loading various kinds of recording media, such as a memory card, a magnetic disk, an optical disc, etc., and a card slot for inserting a card for accounting processing, etc., are provided at the upper side of the outlet 2. Also, the image printer 1 is provided with an image display section 4 on which a touch panel is provided at the upper side of the insertion slot 3. The selection of various kinds of menu options displayed in the image display section 4 is detected by the touch panel in order to accept the user's operation.

Figure 3:
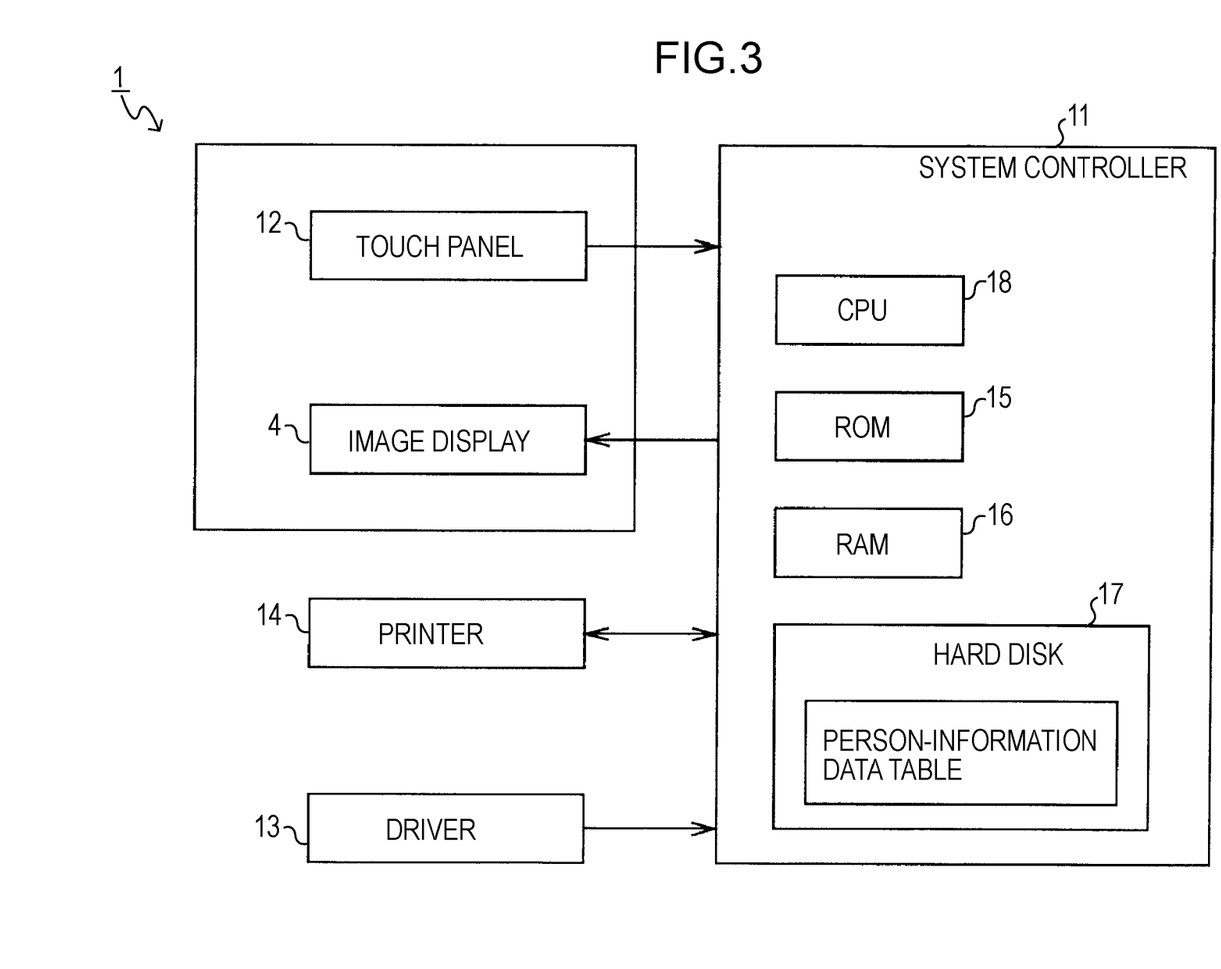
FIG. 3 is a block diagram of the image printer of FIG. 2.

FIG. 3 is a block diagram illustrating the image printer 1. In the image printer 1, the image display section 4 displays various menus necessary for the processing of the image printer 1 under the control of a system controller 11, and a touch panel 12 notifies the menu selection by the user to the system controller 11. A driver 13 obtains a still image file from various kinds of recording medium inserted into the recording medium insertion slot 3, and notifies it to the system controller 11. A printer 14 prints still images under the control of the system controller 11, and sends photographs as the print result to the outlet 2.

The system controller 11 is control means for controlling the operation of the image printer 1, reserves a work area in a random access memory (RAM) 16 in accordance with the record of a read only memory (ROM) 15, and executes the programs recorded in a hard disk 17 by the central processing unit (CPU) 18 to control the operation of each section. In this regard, in this embodiment, the programs executed by the central processing unit 18 are provided by being installed in the image printer 1 in advance. However, the programs may be provided by being recorded in a recording medium, such as an optical disc, a magnetic disk, a memory card, etc., instead. Also, the programs may be provided by being downloaded through a network, such as the Internet, etc.

Thus, the hard disk 17 stores and holds the programs to be executed by the central processing unit 18, and the intermediate processing data obtained by executing the programs. Here, in this embodiment, a person-information data table described below is allocated to one of the intermediate processing data.

Figure 1:
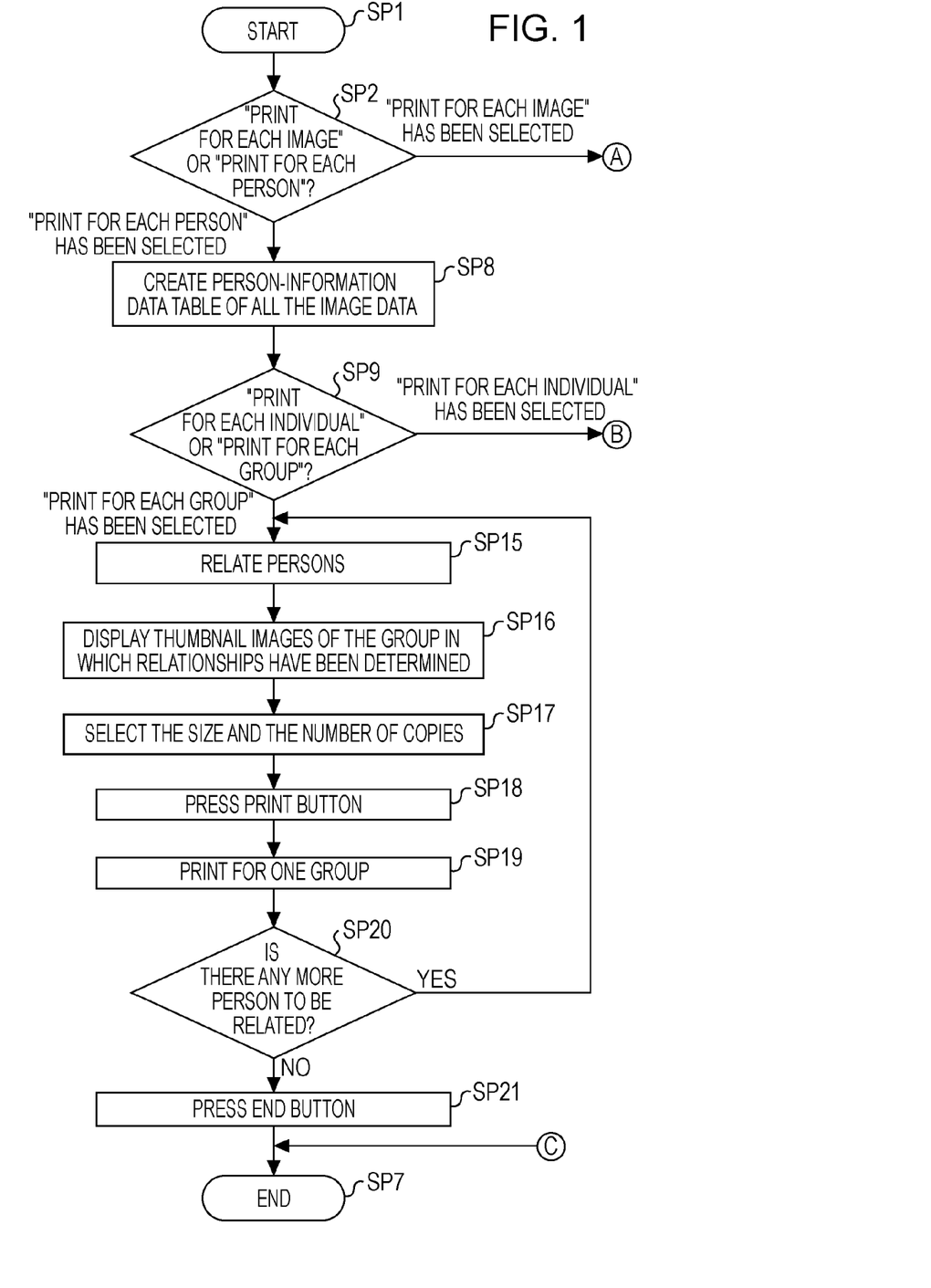
FIG. 1 is a flowchart illustrating the processing procedure in an image printer according to a first embodiment of the present invention.
Figure 4:
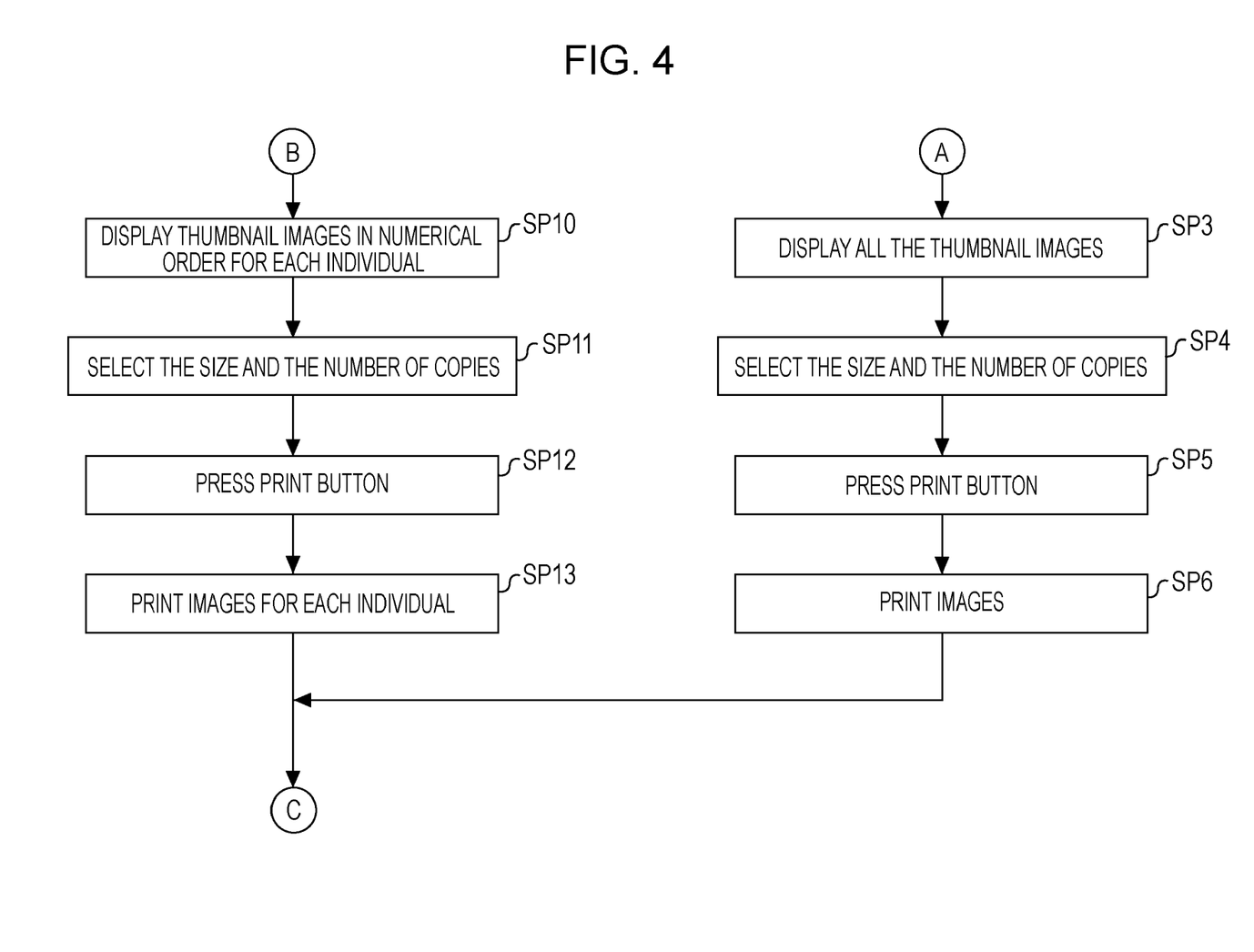
FIG. 4 is a flowchart illustrating the processing procedure subsequent to FIG. 1.
Figure 5:
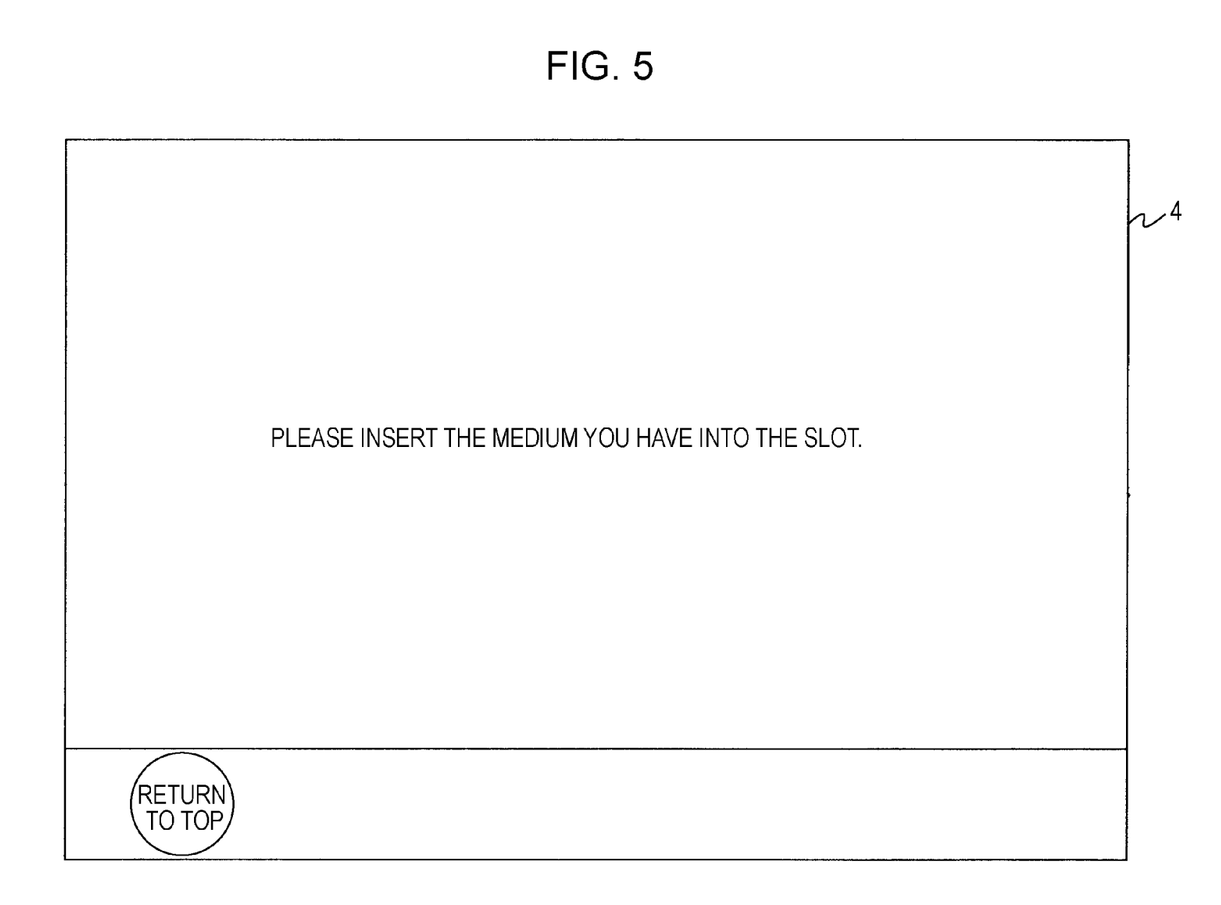
FIG. 5 is a plan view illustrating a display screen of the image printer of FIG. 2.

FIGS. 1 and 4 are flowcharts illustrating the processing procedure of the central processing unit 18. In the initial state, the central processing unit 18 displays a predetermined main menu screen on the image display section 4. Here, a menu for selecting various kinds of processing is displayed on the main menu screen. When the selection of the menu for instructing the printing of the still images recorded on the recording medium is detected in the main menu screen through the touch panel 12, the central processing unit 18 changes the display of the image display section 4 and displays the message prompting the user to attach a recording medium as shown in FIG. 5. Also, when the attachment of the recording medium is detected through the driver 13, the processing procedure shown in FIGS. 1 and 4 is started, and the processing proceeds from step SP1 to step SP2.

Figure 6:
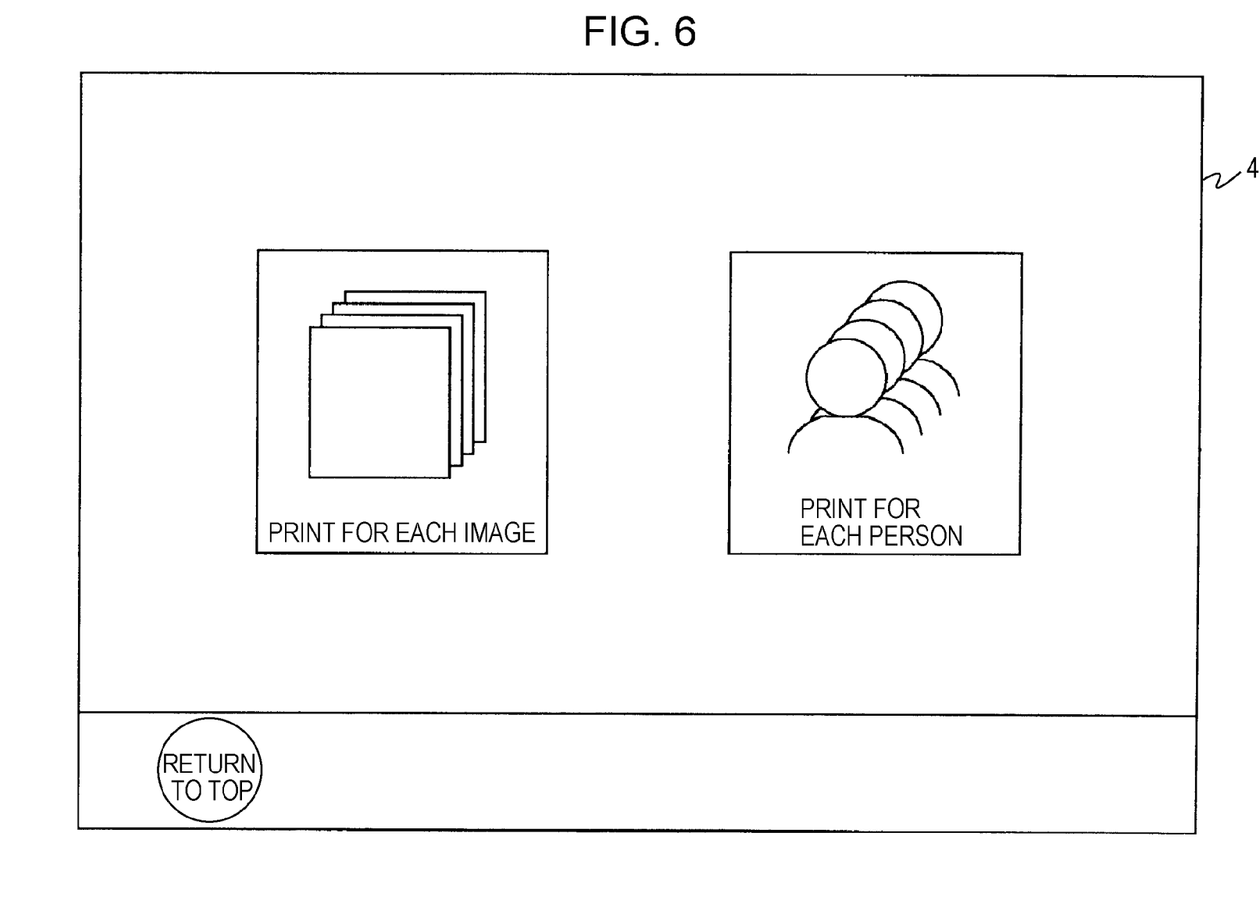
FIG. 6 is a plan view illustrating a print menu screen of the image printer of FIG. 2.

In step SP2, the central processing unit 18 displays a print menu screen shown in FIG. 6, and accepts the selection by the user. Here, the print menu screen is provided with two menu options "print for each image" and "print for each person". Here, "print for each image" is an operation mode in which the setting of the number of print copies and the print size are accepted from the user for each still image, and thus the photographs are printed. In contrast, "print for each person" is an operation mode in which images including a specific person is selectively displayed, the setting of the number of print copies and the print size are accepted from the user to print the photographs.

Figure 7:
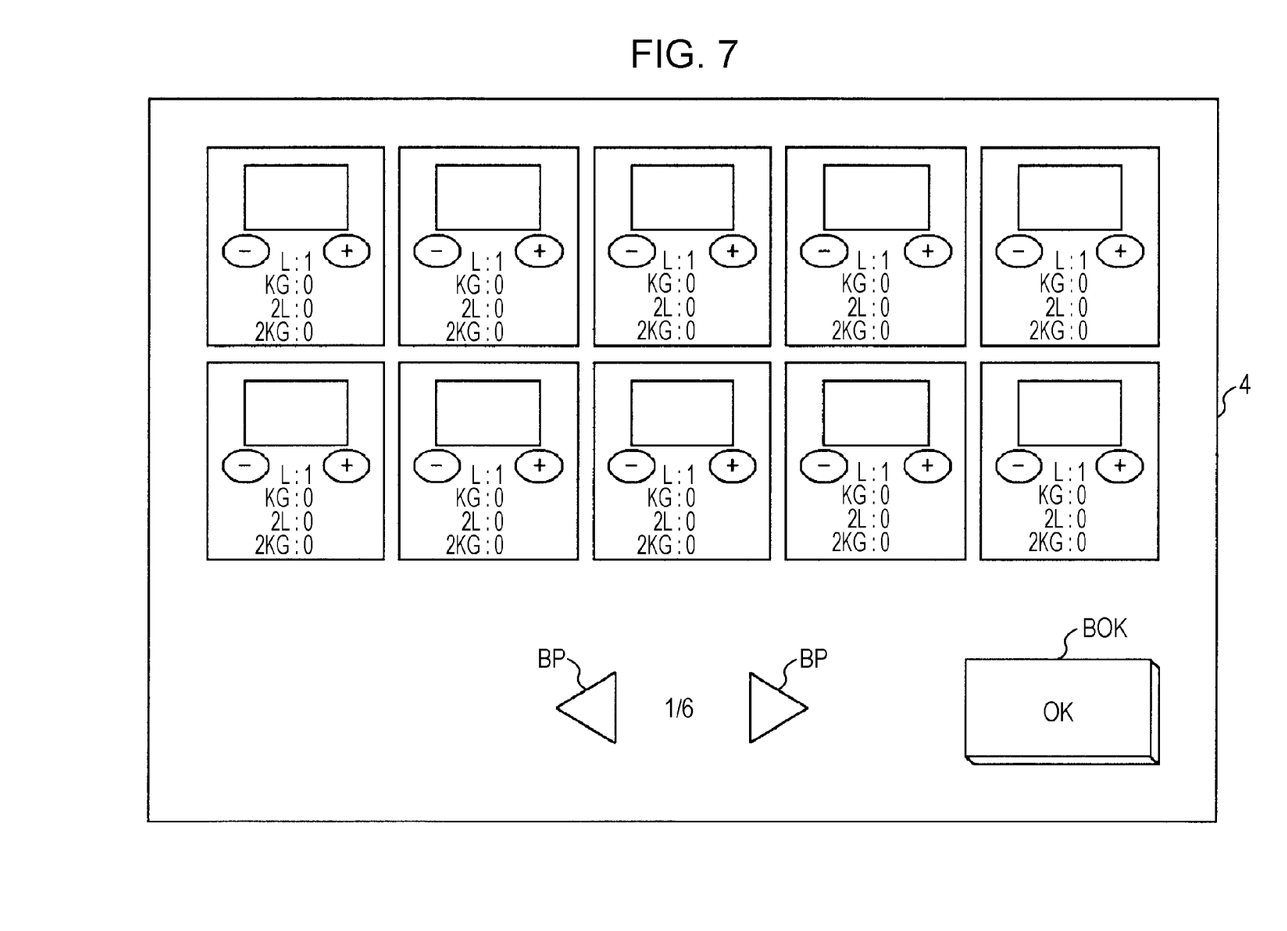
FIG. 7 is a plan view illustrating a list display by thumbnail images of the image printer of FIG. 2.

When the central processing unit 18 displays the print menu screen, if the user selects the "print for each image", the processing proceeds from step SP2 to step SP3, the central processing unit 18 displays the still images recorded on the recording medium attached by the user in a list by the thumbnail images. Here, FIG. 7 is a plan view illustrating a list display by the thumbnail images. The print size and the number of print copies are displayed for each thumbnail image on this display screen. Also, the page scroll button BP and the OK button BOK are displayed at the lower side. In this regard, the central processing unit 18 displays by default, for example the print size indicated by an alphabetic character L and one copy of each of the still images for the print size and the number of print copies, respectively.

In the subsequent step SP4, when any one of the thumbnail images is selected, the central processing unit 18 displays a sub-menu for entering the number of print copies and the print size. The central processing unit 18 accepts the change of the print size and the number of print copies in accordance with the user's operation. Also, when the page-scroll button BP is operated at this time, the central processing unit 18 scrolls the list display of the thumbnail images.

Also, after the user has instructed the number of print copies and the print size, in step SP5, when the user operates the OK button BOK, the processing proceeds from step SP5 to step SP6, and the central processing unit 18 controls the printer 14 to print out the still images with the user specified number of print copies and print size. After that, the processing proceeds to step SP7, and the processing procedure is terminated. In this regard, when the user starts the printing, if the user instructs to print the list, the central processing unit 18 prints the list of the thumbnail images.

On the other hand, when the user selects "print for each person" in the print menu screen, the processing of the central processing unit 18 proceeds from step SP2 to step SP8.

In step SP8, the central processing unit 18 creates a person-information data table. Here, the person-information data table is a table in which what objects are included in each of the still images recorded on the attached recording medium. In this embodiment, the objects shown in the person-information data table is a person.

The central processing unit 18 reads the still images recorded on the recording medium in sequence, and extracts individual faces from each image file by applying, for example a method of pattern matching. Also, for example the central processing unit 18 sorts, for each person, each face image extracted by the face determination using, for example the characteristic points. In this regard, this processing is not limited to a method of pattern matching and the face determination using the characteristic points, and various methods can be applied. Thus, the central processing unit 18 detects the objects taken in the photographs for each still image.

Also, the central processing unit 18 arranges the objects detected in each of the still images with respect to a plurality of still images recorded on the recording medium, and detects the objects included in the plurality of the still images. Also, the central processing unit 18 determines what objects are included in each still image, and generates person-information data. Also, the central processing unit 18 summarizes the person-information data with respect to a plurality of the still images recorded on the recording medium to form a person-information data table.

Figure 8:
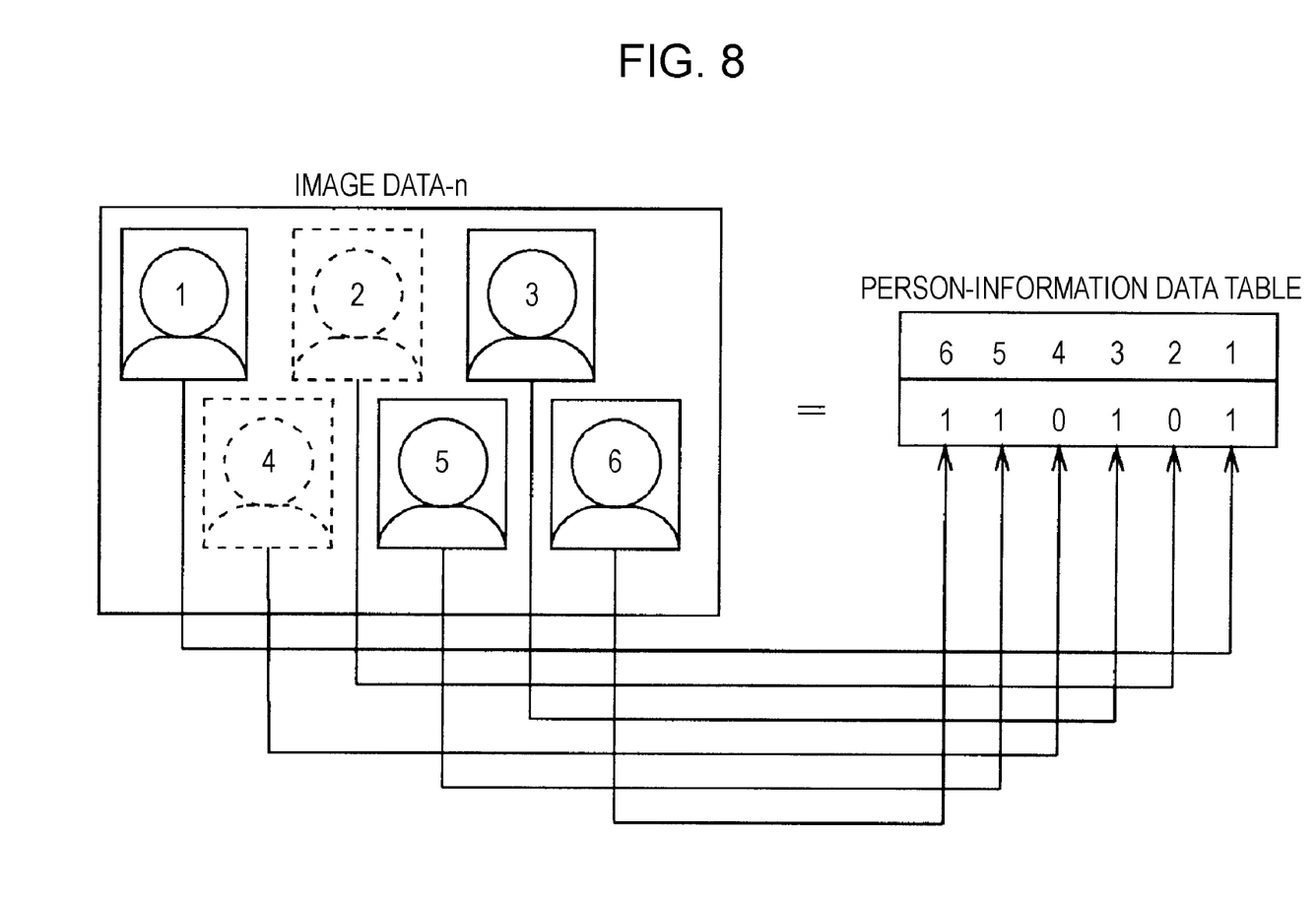
FIG. 8 is a schematic diagram for explaining personal information data in the image printer of FIG. 2.

That is to say, for example as shown in FIG. 8, suppose that persons are individually detected in the image files of the attached recording medium, the detection results of all the still images are processed, and thus six persons marked with a circled numbers 1 to 6 are included in the plurality of still images. Also, in this case, suppose that four persons having the numbers 1, 3, 5, and 6 are included in the n-th still image out of these six persons. In this case, the central processing unit 18 sets the number of persons detected in the still images of the attached recording medium to the number of bits in the person-information data. Also, each bit of the lower-bit side of the person-information data is allocated to the bit indicating the existence or non-existence of each of the six persons, and the person-information data of each still image is generated by setting the individual bits for each still image. Accordingly, for the n-th still image shown in FIG. 8, the person-information data "110101" is created.

Figure 9:
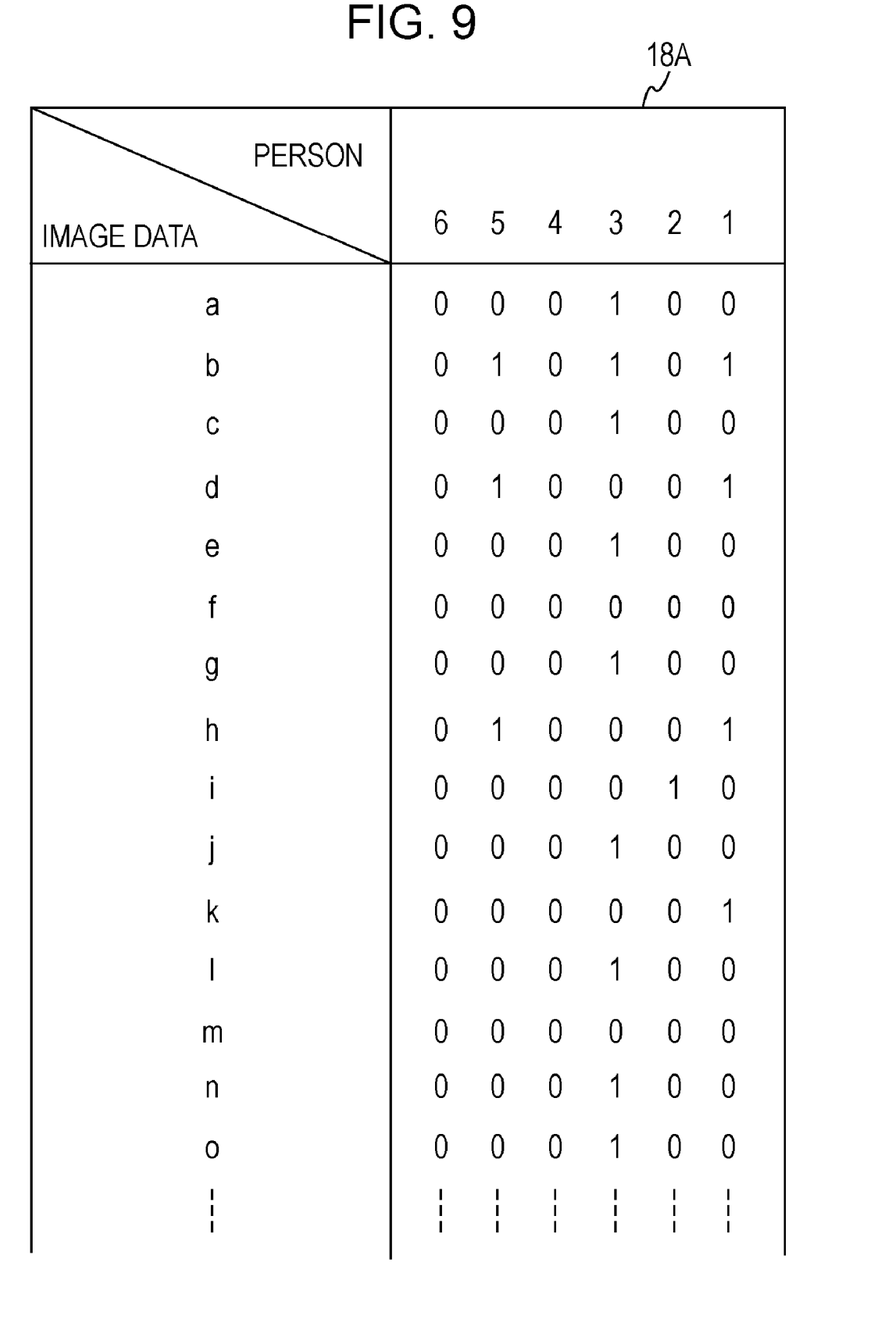
FIG. 9 is a schematic diagram for explaining personal-information data table in the image printer of FIG. 2.

As shown in FIG. 9, the central processing unit 18 summarizes and tabulates the person-information data of the still images a, b, c, . . . , recorded on the recording medium to create the person-information data table. Also, the central processing unit 18 selects a still image including the largest size of the person for each person, cuts out that face image, and thus obtains the face image of each person to hold the image in the hard disk 17.

Figure 10:
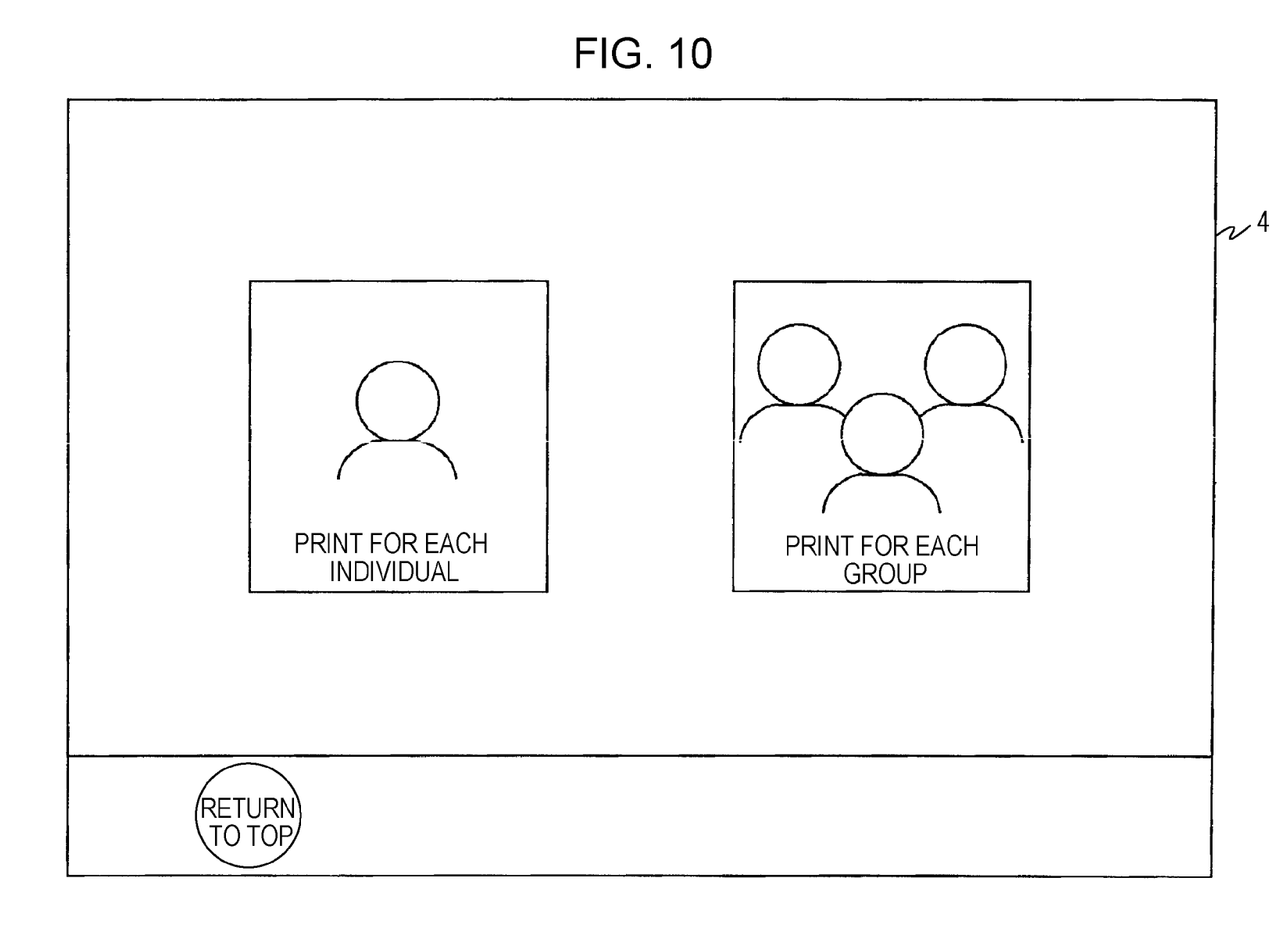
FIG. 10 is a plan view illustrating a sub-menu screen of the image printer of FIG. 2.

Next, the processing of the central processing unit 18 proceeds to step SP9, and the central processing unit 18 changes the display of the image display section 4 to the sub-menu screen of "print for each person". Here, as shown in FIG. 10, in this sub-menu screen, the menu option "print for each individual" and the menu option "print for each group" are displayed. Here, "print for each individual" is a mode in which the still images including each person are displayed in a list by thumbnail images in sequence, and the print size and the number of print copies are accepted from the user. On the other hand, "print for each group" is a mode in which the setting of groups is accepted from the user, then the still images including persons belonging one group are displayed in a list by thumbnail images, and the print size and the number of print copies are accepted from the user.

In this sub-menu screen, when the user selects the menu option "print for each individual", the processing of the central processing unit 18 proceeds from step SP9 to step SP10, and the central processing unit 18 displays the still images including each person by thumbnail images in a list for each person in order from the lower bit of the person-information data.

Figure 11:
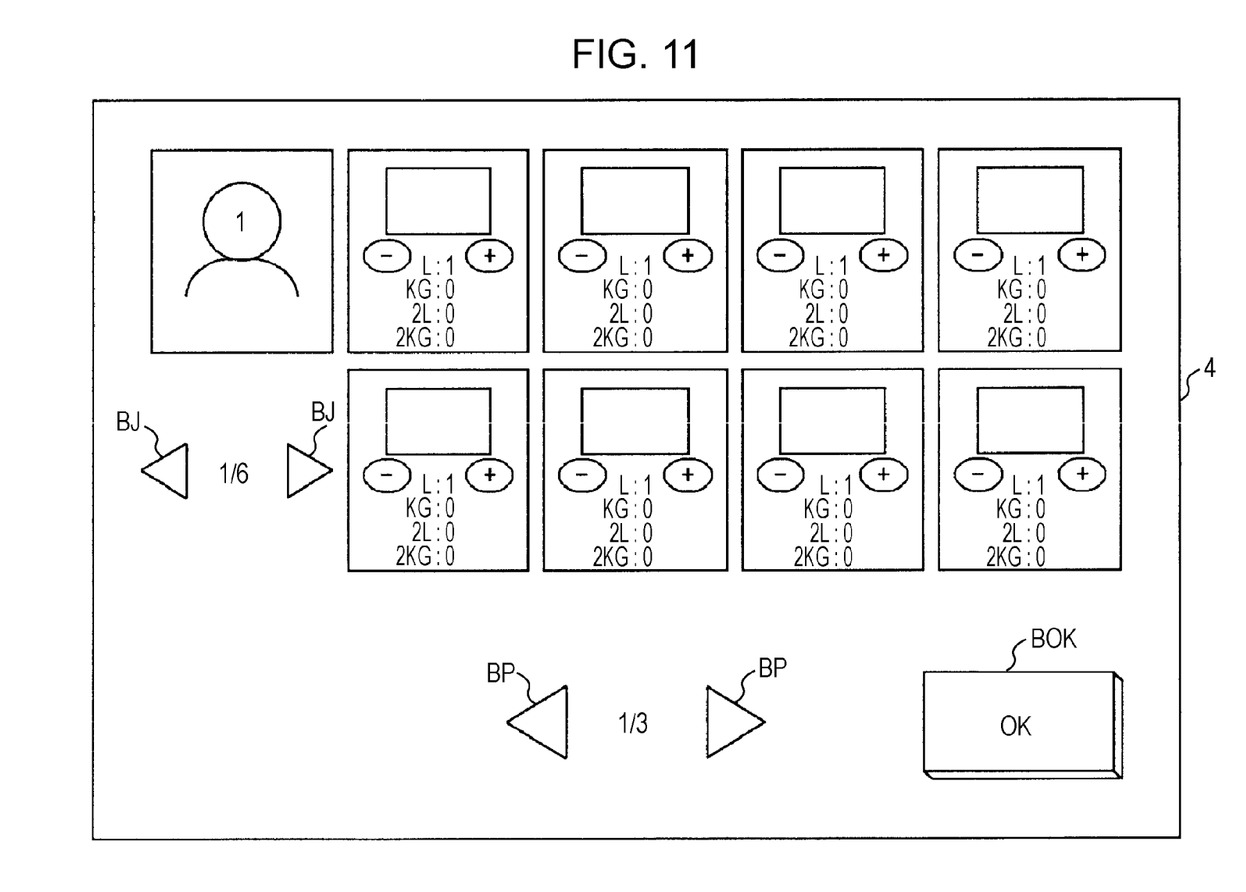
FIG. 11 is a plan view illustrating the list display by thumbnail images subsequent to the sub-menu of FIG. 10.

Here, FIG. 11 is a plan view illustrating a list display of the thumbnail images by the processing of step SP10. The central processing unit 18 selects the face image of the person allocated to the least significant bit from the face images obtained when creating the person-information data table, and displays this face image at the upper left on the screen. Also, the central processing unit 18 searches the person-information data table to detect the still images including this person, and displays the thumbnail images of the detected still images. Also, the central processing unit 18 displays the button BJ for changing persons under the face image. In response to the operation of this button BJ, the central processing unit 18 changes the persons of the face images, and changes the persons to be displayed by the thumbnail images in conjunction with the face image change.

Also, the central processing unit 18 displays the page scroll button BP and the OK button BOK at the lower part on the display screen 4. In this regard, in this case, the central processing unit 18 displays by default, for example the print size indicated by the alphabetic character L and one copy of each of the still images for the print size and the number of copies for each thumbnail image, respectively.

In the subsequent step SP11, when any one of the thumbnail images is selected, the central processing unit 18 displays a sub-menu for changing the number of print copies and the print size. The central processing unit 18 accepts the change of the print size and the number of print copies in accordance with the user's operation. Also, when the page-scroll button BP is operated at this time, the central processing unit 18 scrolls the list display of the thumbnail images.

Also, after the user has instructed the number of print copies and the print size, in step SP12, when the user operates the OK button BOK, the processing proceeds from step SP12 to step SP13, and the central processing unit 18 prints out the still images in sequence in accordance with the specified number of print copies and print size. After the printing, the processing of the central processing unit 18 proceeds to step SP7, and the processing procedure is terminated. Accordingly, in this case, the central processing unit 18 prints the photographs including each person for each photographed person in order from the lower bit set in the person-information data. In this regard, when the user starts the printing, if the user instructs to print the list display, the central processing unit 18 also prints the list display of the thumbnail images for each person displayed in step SP10 in this case.

On the other hand, in step SP9, when the menu selection of "print for each group" is detected, the processing of the central processing unit 18 proceeds from step SP9 to step SP15, and the central processing unit 18 accepts the setting of groups. Here, the setting of groups is the processing for detecting the objects having strong relationships out of the plurality of objects detected in the plurality of the still images recorded on the recording medium. In this embodiment, the setting operation by the user is accepted, and the processing is started.

Figure 12:
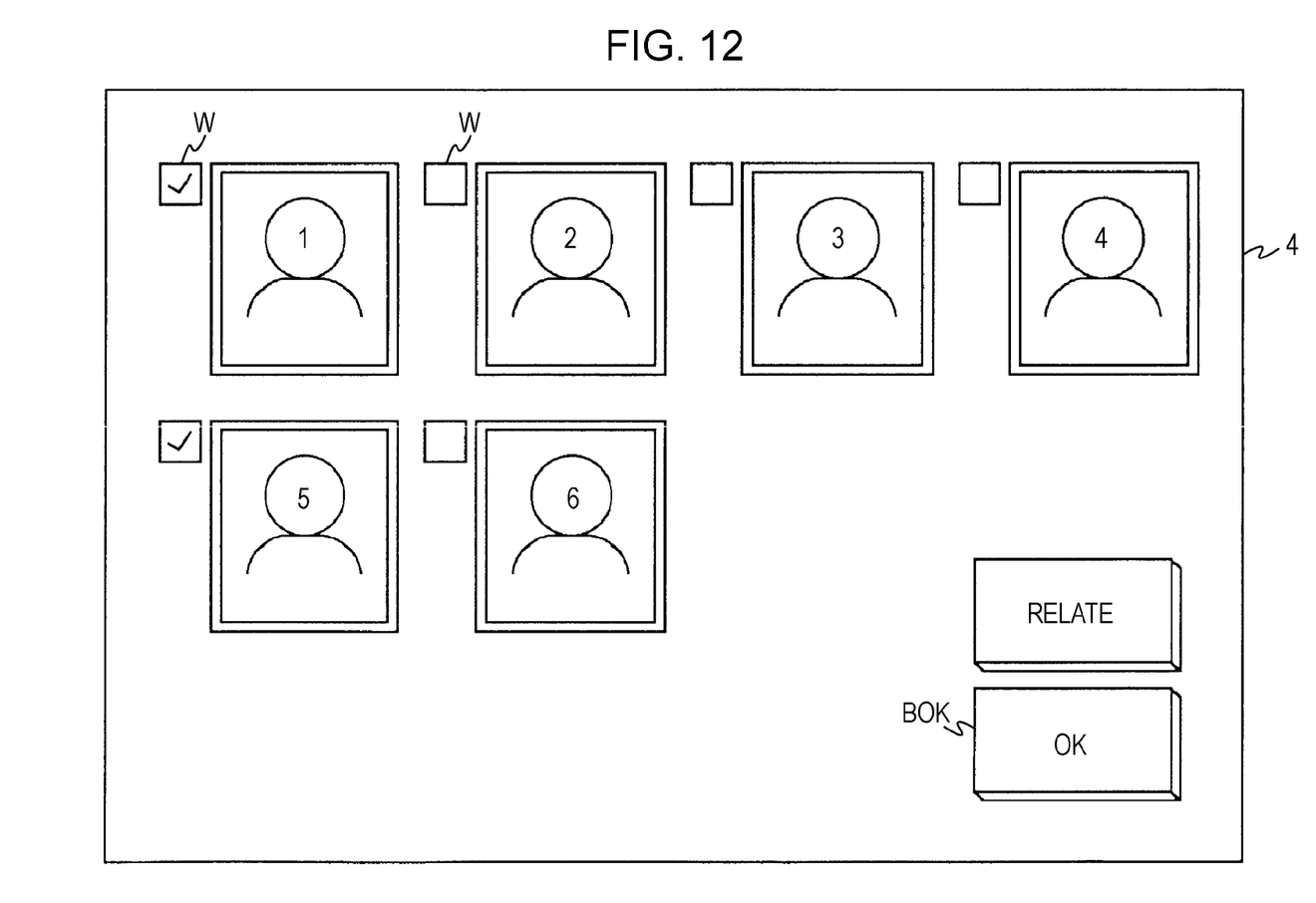
FIG. 12 is a plan view illustrating a relationship setting screen of image printer of FIG. 2.

More specifically, the central processing unit 18 displays the relationship setting screen shown in FIG. 12. Here, the relationship setting screen is a screen for relating the persons detected in step SP8 and identifying the persons belonging to one group. On the relationship setting screen, the face images detected in step SP8 are arranged. Also, the check box W is provided at the side of each face image.

When the selection of the face image is detected through the touch panel 12, the central processing unit 18 switches the display of the check box W of the selected face image between with check (shown by a check mark in FIG. 12) and without check (shown by no mark in FIG. 12). Also, when the relate button is operated, the central processing unit 18 registers the persons of the face images having a check for the persons belonging to a related group, and switches the check box W of the face image of that person to have no check. Also, the central processing unit 18 uses a specific color frame for the display of the face image of that person to allow the user to know that the person has been related.

When the relationship has been set in this manner, and then if the user operates the OK button BOK, the processing of the central processing unit 18 proceeds from step SP15 to step SP16. In step SP16, the central processing unit 18 displays the still images including the persons related in step SP 15 in a list by the thumbnail images.

Figure 13:
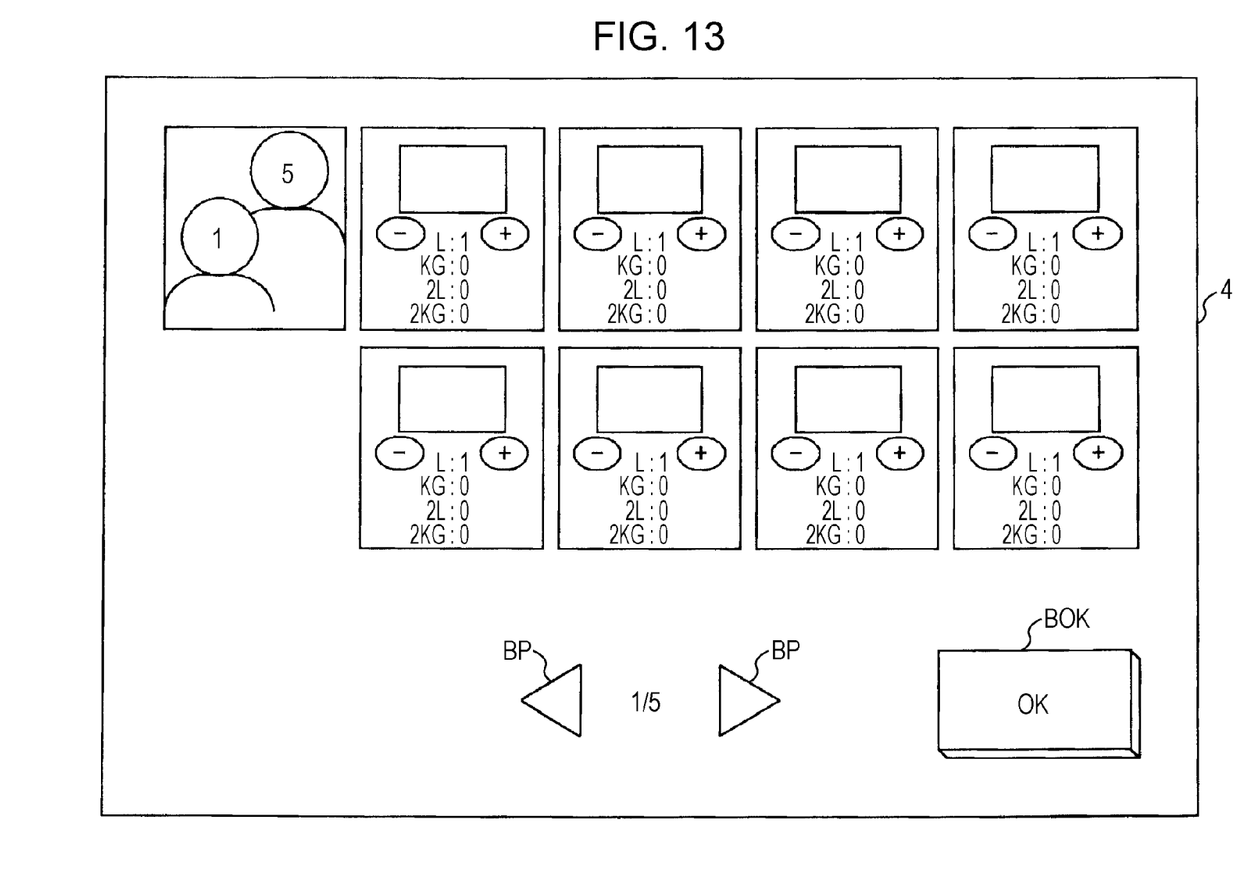
FIG. 13 is a plan view illustrating the list display by thumbnail images subsequent to the relationship setting screen of FIG. 12.

Here, the central processing unit 18 searches the person-information data table, and detects the still images including any one of the persons related in step SP16, and displays the detected still images in a list by the thumbnail images. Also, the central processing unit 18 summarizes and displays the face images of the persons related in step SP16 at the left end of the list. Accordingly, an example in FIG. 13 is the case where the persons of the numbers 1 and 5 are related in step SP15 immediately before.

Also, the central processing unit 18 displays the page scroll button BP and the OK button BOK at the lower part on the display screen. In this regard, in this case, the central processing unit 18 displays by default, for example the print size indicated by the alphabetic character L and one copy of each of the still images for the print size and the number of copies of each thumbnail image, respectively.

In the subsequent step SP17, when any one of the thumbnail images is selected, the central processing unit 18 displays a sub-menu for changing the number of print copies and the print size. The central processing unit 18 accepts the change of the print size and the number of print copies in accordance with the user's operation. Also, when the page-scroll button BP is operated at this time, the central processing unit 18 scrolls the list display of the thumbnail images.

Also, after the user has instructed the number of print copies and the print size, in step SP18, when the user operates the OK button BOK, the processing proceeds from step SP18 to step SP19, and the central processing unit 18 prints out the still images whose thumbnail images are displayed in accordance with the specified number of print copies and print size. In this regard, when the user starts the printing, if the user instructs to print the list display, the central processing unit 18 also prints the list display of the thumbnail images displayed in step SP16 in this case.

In the subsequent step SP20, the central processing unit 18 changes the display of the screen display section 4 to a menu screen showing menu options "print end" and "print continue". Here, if the user selects the "print continue" option, the processing of the central processing unit 18 proceeds from step SP20 to step SP15, accepts the setting of relationships for another group once again, and starts the print processing. On the other hand, if the user selects the "print end" option, the processing of the central processing unit 18 proceeds from step SP20 to step SP7, and terminates this processing procedure.

2. Operation of Embodiment

With the above configuration, in the image printer 1 (FIGS. 1 to 5), when the user attaches a recording medium, such as a memory card, etc., and instructs to print for each image, a list of the still images recorded on the recording medium is displayed by the thumbnail images. In this list display, the print size and the number of copies of each still image are accepted (FIGS. 6 and 7). Also, when the user sets the print size and the number of print copies, and instructs to print, each still image is printed in sequence by the set print size and number of print copies, and then ejected from the outlet 2. Thus, the user can obtain desired still images by the desired print size and number of print copies.

However, the still images to be printed in this manner sometimes include one person, and sometimes include many persons. For a still image including only one person, only the copies for that person should be printed. On the other hand, when there are many persons taken in a photograph, there are cases where the many persons are family members, or cases where the many persons are unrelated persons, namely group members who are friends. Accordingly, when a still image including many persons is of a family, only one still image should be printed. On the other hand, if this still image is of group members, who are friends but unrelated persons, it becomes necessary to print out the same number of copies of the still images as the number of persons.

Accordingly, when the user sets the number of print copies by simply viewing the list display of the thumbnail images of the still images recorded on a recording medium, it is necessary for the user to set the number of copies for distribution of each photograph while checking relationships among the persons included in the still images. Thus, the setting for the printing becomes troublesome.

Thus, in the image printer 1, when the user selects the menu option "print for each person" (FIGS. 1 and 5), the persons, which are photographed objects, are detected for each still image recorded on the recording medium. Also, the detection result is arranged with respect to a plurality of still images recorded on the recording medium, the objects included in the plurality of still images are detected, and the person-information data table indicating what person is included in each still image is formed (FIGS. 8 and 9).

Also, when the user instructs to carry out "print for each group" next, the objects included in the plurality of still images are displayed in a list (FIG. 12). In this list display, the objects having strong relationships are set in response to the user's operation. Also, the persons belonging to one group, for example a family, etc., are identified by the setting.

In the image printer 1, the still images including at least one object having a relationship set in this manner are selected from the plurality of still images recorded on the recording medium and displayed by the thumbnail images in order to accept the print size and the number of print copies. Accordingly, for example when the user prints a large number of still images taken at a party hall, if the user relates the objects for families, couples, brothers and sisters in advance, the user can print still images for these families, couples, brothers and sisters. Thus, the user can simplify the setting work of the number of print copies at printing time compared with before. Also, the user can prevent from printing redundant copies mistakenly, etc. On the contrary, the user can prevent from falling shortage of print copies mistakenly. Thus, it is possible to reduce various kinds of waste.

Thus, in the image printer 1, by setting the print size and the number of print copies in this list, and instructing to print, the user can print the still images of the desired group members by the set print size and number of print copies.

Also, in the image printer 1, at the time of printing the images, if the user instructs to print a list display, a list display by the thumbnail images of the still images including the group members is printed. Here, the print of the list display by such thumbnail images can be used for checking the number of print copies additionally later, and so on. In the case of this embodiment, the printing of the list of thumbnail images are on the still images including the group members, and thus it is possible to print the list display of the thumbnail images without allowing the group members to be aware of the still images of the complete strangers recorded on the same recording medium. Thus, it is possible to improve user friendliness of the print result.

On the other hand, when the user instructs to carry out "print for each individual" (FIGS. 10 and 11), the thumbnail images are displayed in a list for each object detected on the recording medium, and the setting of the number of print copies and the print size are accepted using the thumbnail images. Also, the still images are printed for each object with the set number of print copies and print size.

Accordingly, for example when the user takes photographs at a party including a plurality of persons, and distributes the copies of the captured still images to each person, it is possible for the user to obtain the print result by sorting for each person, and thus the distribution work of the print result can be simplified. Also, it is possible for the user to reliably print the necessary number of print copies for each person, and to prevent a shortage of copies or a surplus of print copies.

3. Advantages of Embodiment

By the above configuration, it is possible to detect objects having a strong relationship among objects which have been detected from a plurality of still images, and to select and output the still images including at least one of the objects. Thereby, the present invention enables the user to figure out the number of copies for distribution easily to process still images.

Also, by displaying the still images including at least one of the objects in a list, and allowing the user to set a strong relationships among the objects, it is possible to process the still images easily, reliably, and furthermore by reflecting various intentions of the user.

Also, since the objects are persons, and the output of the still images is printing the still images onto paper, it is possible for the user to figure out the number of copies for distribution easily to perform print processing of the still images.

Also, by printing a list display of thumbnail images of the still images onto paper, it is possible to additionally print the still images conveniently without showing the still images including the other persons.

Also, by the user selecting the menu and sorting the a plurality of still images for each object detected in the plurality of still images, it is possible for the user to figure out the number of copies for distribution easily to process still images, and to improve user friendliness furthermore.

Second Embodiment

In this regard, in the above-described embodiment, a description has been given of the case of outputting still images by printing. However, the present invention is not limited to this, and can be widely applied to the case of outputting still images by recording the images onto a recording medium, such as an optical disc, a magnetic disk, a memory card, etc., and further to the case of outputting still images to a network, etc., which is communication means, by attaching the images to a mail, PtoP, etc.

Also, in the above-described embodiment, a description has been given of the case where the objects are persons. However, the present invention is not limited to this, and can be widely applied to the case where for example, the objects are plants and animals, scenes, various kinds of transportation means, etc. That is to say, in this case, it is possible to perform processing, such as selectively printing the still images including either of a specific type of vehicle and a specific person from the recording medium, such as an optical disc, etc., recording a large number of still images.

Also, in the above-described embodiment, a description has been given of the case where still images are simply printed on the basis of the person-information data table. However, the present invention is not limited to this. The created person-information data table may be recorded onto a recording medium, and may be used for the subsequent still image processing.

Also, in the above-described embodiment, a description has been given of the case where the present invention is applied to an image printer. However, the present invention is not limited to this, and can be widely applied to the case of an image processing program in a personal computer, a personal-use printer to which a recording medium is directly attached for printing, a preview apparatus of still image files, etc.

It should be understood by those skilled in the art that various modifications, combinations, sub-combinations and alterations may occur depending on design requirements and other factors insofar as they are within the scope of the appended claims or the equivalents thereof.

What is claimed is:

1. A method, implemented on a machine comprising a system controller having at least one processor for processing a plurality of still images, comprising the steps of:
   detecting, with the system controller, at least one object in the plurality of still images;
   arranging, with the system controller, objects detected in the detecting step to determine a plurality of objects within the plurality of still images;
   relating, with the system controller, objects having a relationship out of the plurality of objects determined in the arranging step;
   selecting, with the system controller, a still image including at least one of the objects related in the relating step from the plurality of still images; and
   outputting the selected still image.

2. The method of claim 1, wherein the step of relating objects includes:
   displaying a list of the objects determined in the arranging step;
   accepting a plurality of object selections from the displayed list; and
   selecting objects to set the plurality of objects to the objects having the relationship.

3. The method of claim 1, wherein:
   the object includes a person, and
   outputting the still image includes printing the still image onto a paper.

4. The method of claim 3, wherein printing the still image onto the paper includes printing for each of the still images.

5. The method of claim 3, wherein printing the still image onto the paper includes printing a list display by thumbnail images of the still images.

6. The method of claim 1, wherein outputting the still image includes outputting a corresponding still-image file to communication means.

7. The method of claim 1, wherein outputting the still image includes recording a corresponding still-image file on a recording medium.

8. The method of claim 1, further comprising, for each object determined in the arranging step,
   selecting a still image including the object from the plurality of still images; and
   outputting the still image for each object.

9. A non-transitory computer-readable medium encoded with computer-executable instructions, the computer-executable instructions, when executed, operable to cause one or more processors to:
   detect at least one object in the plurality of still images;
   arrange objects detected in the detecting step to determine a plurality of objects within the plurality of still images;
   relate objects having a relationship out of the plurality of objects determined in the arranging step;
   select a still image including at least one of the objects related in the relating step from the plurality of still images; and
   output the selected still image.

10. An image processing apparatus for processing a plurality of still images, comprising:
    an object detection section configured for detecting at least one object in the plurality of still images;
    an object arrangement section configured for arranging objects detected by the object detection section to determine a plurality of objects within the plurality of still images;
    a relating section configured for relating objects having a relationship out of the plurality of objects determined by the object arrangement section;
    a still-image selection section configured for selecting a still image including at least one of the objects related by the relating section from the plurality of still images; and
    a still-image outputting section configured for outputting the still image selected by the still-image selection section.

* * * * *